United States Patent
Jairazbhoy et al.

(10) Patent No.: US 9,368,845 B2
(45) Date of Patent: Jun. 14, 2016

(54) TRACTION BATTERY THERMAL PLATE WITH MULTI PASS CHANNEL CONFIGURATION

(71) Applicant: Ford Global Technologies, LLC, Dearborn, MI (US)

(72) Inventors: Vivek Amir Jairazbhoy, Farmington Hills, MI (US); George Albert Garfinkel, Westland, MI (US); Neil Robert Burrows, White Lake Township, MI (US); LeeAnn Wang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 229 days.

(21) Appl. No.: 14/189,098

(22) Filed: Feb. 25, 2014

(65) Prior Publication Data

US 2015/0244038 A1 Aug. 27, 2015

(51) Int. Cl.

| H01M 10/60 | (2014.01) |
|---|---|
| H01M 6/50 | (2006.01) |
| H01M 10/613 | (2014.01) |
| H01M 10/615 | (2014.01) |
| H01M 10/617 | (2014.01) |
| H01M 10/625 | (2014.01) |
| H01M 10/61 | (2014.01) |
| H01M 10/6556 | (2014.01) |

(52) U.S. Cl.
CPC .............. *H01M 10/613* (2015.04); *H01M 6/50* (2013.01); *H01M 6/5038* (2013.01); *H01M 10/5016* (2013.01); *H01M 10/5057* (2013.01); *H01M 10/60* (2015.04); *H01M 10/61* (2015.04); *H01M 10/615* (2015.04); *H01M 10/617* (2015.04); *H01M 10/625* (2015.04); *Y02T 10/7005* (2013.01)

(58) Field of Classification Search
CPC ... H01M 10/60; H01M 10/61; H01M 10/613; H01M 10/615; H01M 10/617; H01M 10/62; H01M 10/625
USPC ......................................................... 429/120
See application file for complete search history.

(56) References Cited

U.S. PATENT DOCUMENTS

| 4,322,776 A * | 3/1982 | Job ...................... H05K 7/1418 |
|---|---|---|
| | | 165/185 |
| 8,268,472 B2 | 9/2012 | Ronning et al. |
| 8,297,686 B2 | 10/2012 | Redmond |
| 2004/0126629 A1* | 7/2004 | Reiser ................. H01M 8/0258 |
| | | 429/436 |

(Continued)

FOREIGN PATENT DOCUMENTS

JP 2010157502 A 7/2010

*Primary Examiner* — Scott J Chmielecki
(74) *Attorney, Agent, or Firm* — David B. Kelley; Brooks Kushman P.C.

(57) ABSTRACT

A traction battery assembly for a vehicle is provided. The traction battery assembly may include a plurality of battery cells and a thermal plate positioned beneath the battery cells. The thermal plate may be configured for thermal communication with the plurality of battery cells. The thermal plate may define a plurality of multi-pass channel configurations, each corresponding to one of the battery cells. The multi-pass channel configurations may each include a channel inlet and channel outlet on opposite side portions of the thermal plate. The multi-pass channel configurations may each be configured to direct thermal fluid flowing therein to an outlet port of the thermal plate without directing fluid to the channel inlet of another channel configuration.

15 Claims, 5 Drawing Sheets

(56) References Cited

U.S. PATENT DOCUMENTS

| | | | |
|---|---|---|---|
| 2007/0141453 A1* | 6/2007 | Mahalingam | H01M 10/42 429/120 |
| 2009/0023056 A1* | 1/2009 | Adams | B60L 11/1872 429/120 |
| 2009/0258289 A1 | 10/2009 | Weber et al. | |
| 2010/0151300 A1 | 6/2010 | Gutsch et al. | |
| 2010/0307723 A1* | 12/2010 | Thomas | B60H 1/00278 165/104.33 |
| 2011/0027640 A1* | 2/2011 | Gadawski | H01M 2/0212 429/120 |
| 2011/0200862 A1 | 8/2011 | Kurosawa | |
| 2011/0206967 A1 | 8/2011 | Itsuki | |
| 2011/0212355 A1 | 9/2011 | Essinger et al. | |
| 2011/0281145 A1 | 11/2011 | TenHouten | |
| 2012/0009455 A1* | 1/2012 | Yoon | H01M 10/6552 429/120 |
| 2012/0045681 A1 | 2/2012 | Klaus et al. | |
| 2012/0148889 A1* | 6/2012 | Fuhr | H01M 2/1077 429/87 |
| 2012/0244397 A1 | 9/2012 | TenHouten et al. | |
| 2012/0308868 A1 | 12/2012 | Kruger et al. | |
| 2013/0108897 A1 | 5/2013 | Christian et al. | |
| 2013/0143093 A1* | 6/2013 | Teng | F28F 3/12 429/120 |
| 2014/0356652 A1* | 12/2014 | Boddakayala | H01M 10/5004 429/50 |

* cited by examiner

TRACTION BATTERY THERMAL PLATE WITH MULTI PASS CHANNEL CONFIGURATION

TECHNICAL FIELD

This disclosure relates to thermal management systems for high voltage batteries utilized in vehicles.

BACKGROUND

Vehicles such as battery-electric vehicles (BEVs), plug-in hybrid-electric vehicles (PHEVs) or full hybrid-electric vehicles (FHEVs) contain a traction battery, such as a high voltage ("HV") battery, to act as a propulsion source for the vehicle. The HV battery may include components and systems to assist in managing vehicle performance and operations. The HV battery may include one or more arrays of battery cells interconnected electrically between battery cell terminals and interconnector busbars. The HV battery and surrounding environment may include a thermal management system to assist in regulating temperature of the HV battery components, systems, and individual battery cells.

SUMMARY

A vehicle includes a plurality of battery cells and a thermal plate. The thermal plate is configured to support the battery cells and defines an exit plenum and a plurality of multi-pass channels. Each of the multi-pass channels corresponds to at least one of the cells and includes an inlet and outlet on opposite side portions of the thermal plate such that fluid exiting the outlet empties into the exit plenum and not into the inlet of another multi-pass channel. The vehicle may include a heat generating module packaged within a vicinity of the thermal plate. The thermal plate may be arranged relative to the module such that one of the inlets is positioned adjacent to the module. Each off the multi-pass channels may be arranged to direct fluid flow back and forth across a same face of one of the battery cells. Each of the battery cells may have a width and a length greater than the width and each of the multi-pass channels may be arranged to direct fluid flow along the length of the corresponding battery cell. Each of the multi-pass channels may correspond to only one of the battery cells. An outlet port may be in fluid communication with the exit plenum and an inlet port may be in fluid communication with the inlets. The outlet port and inlet port may be positioned at opposite ends of the thermal plate.

A traction battery assembly includes a plurality of battery cells and a thermal plate positioned beneath the battery cells. The thermal plate is configured for thermal communication with the battery cells and defines a plurality of multi-pass channel configurations therein. Each of the channel configurations corresponds to one of the battery cells, includes a channel inlet and channel outlet on opposite side portions of the thermal plate, and is configured to direct fluid flowing therein to an outlet port of the thermal plate without directing fluid to the channel inlet of another channel configuration. Each of the multi-pass channel configurations may define an entry channel, an exit channel, and an intermediate channel therebetween. The channels may be arranged such that adjacent channels share a common wall. The channels may be arranged such that the exit channel of one of the channel configurations shares a wall with the entry channel of another channel configuration. Each of the battery cells may have a width and a length greater than the width. Each of the channels may be arranged to direct fluid flow along the length of the corresponding battery cell. Each of the multi-pass channel configurations may be arranged such that a fluid temperature at the channel inlet is less than a fluid temperature at the channel outlet. Each of the multi-pass channel configurations may be arranged such that a fluid temperature at the channel inlet is greater than a fluid temperature at the channel outlet.

A battery thermal system includes a thermal plate defining an inlet port and an outlet port positioned at opposite ends of the thermal plate, and at least two internal multi-pass channel configurations. Each of the multi-pass channel configurations includes at least one entry channel in communication with the inlet port and at least one exit channel in communication with the outlet port. The multi-pass channels are arranged such that fluid flows in a same direction within the entry and exit channels, and such that fluid exiting the exit channel empties into the outlet port and not the entry channel of another multi-pass channel configuration. At least one of the multi-pass channel configurations may further include a second entry channel and two intermediate channels arranged between the entry channels, and at least one exit channel may be arranged between the two intermediate channels. At least one of the multi-pass channel configurations may further include a second exit channel and two intermediate channels arranged between the exit channels, and at least one entry channel may be arranged between the two intermediate channels. One of the exit channels may share a wall with the entry channel of another of the multi-pass channel configurations.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
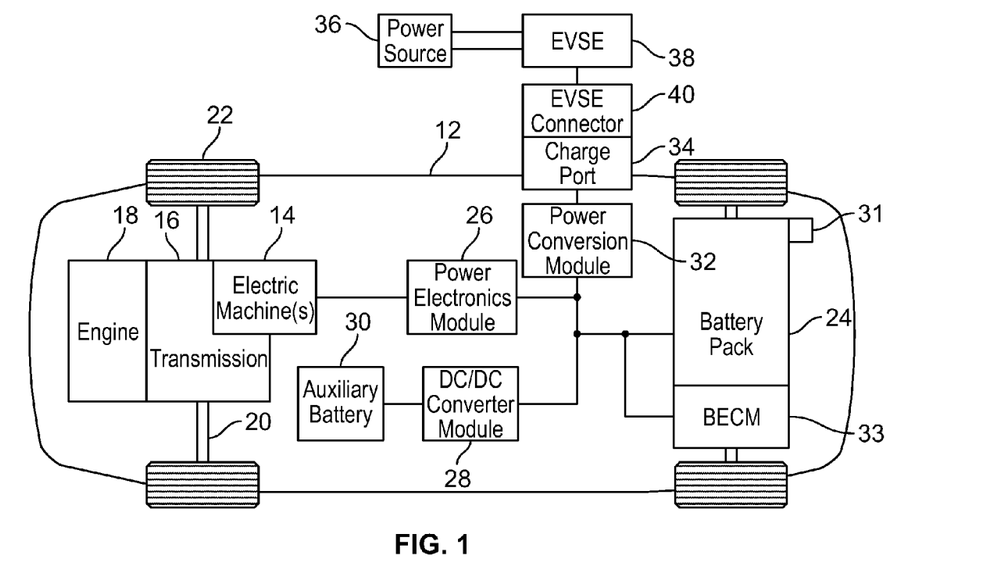
FIG. 1 is a schematic illustration of a battery electric vehicle.

FIG. 1 depicts a schematic of a typical plug-in hybrid-electric vehicle (PHEV). A typical plug-in hybrid-electric vehicle 12 may comprise one or more electric machines 14 mechanically connected to a hybrid transmission 16. The electric machines 14 may be capable of operating as a motor or a generator. In addition, the hybrid transmission 16 is mechanically connected to an engine 18. The hybrid transmission 16 is also mechanically connected to a drive shaft 20 that is mechanically connected to the wheels 22. The electric machines 14 can provide propulsion and deceleration capability when the engine 18 is turned on or off. The electric machines 14 also act as generators and can provide fuel economy benefits by recovering energy that would normally be lost as heat in the friction braking system. The electric machines 14 may also provide reduced pollutant emissions since the hybrid-electric vehicle 12 may be operated in electric mode under certain conditions.

A traction battery or battery pack 24 stores energy that can be used by the electric machines 14. The traction battery 24 typically provides a high voltage DC output from one or more battery cell arrays, sometimes referred to as battery cell stacks, within the traction battery 24. The battery cell arrays may include one or more battery cells. The traction battery 24 is electrically connected to one or more power electronics modules 26 through one or more contactors (not shown). The one or more contactors isolate the traction battery 24 from other components when opened and connect the traction battery 24 to other components when closed. The power electronics module 26 is also electrically connected to the electric machines 14 and provides the ability to bi-directionally transfer electrical energy between the traction battery 24 and the electric machines 14. For example, a typical traction battery 24 may provide a DC voltage while the electric machines 14 may require a three-phase AC voltage to function. The power electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the traction battery 24. The description herein is equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle loads. Other high-voltage loads, such as compressors and electric heaters, may be connected directly to the high-voltage without the use of a DC/DC converter module 28. In a typical vehicle, the low-voltage systems are electrically connected to an auxiliary battery 30 (e.g., 12V battery).

A battery electrical control module (BECM) 33 may be in communication with the traction battery 24. The BECM 33 may act as a controller for the traction battery 24 and may also include an electronic monitoring system that manages temperature and charge state of each of the battery cells. The traction battery 24 may have a temperature sensor 31 such as a thermistor or other temperature gauge. The temperature sensor 31 may be in communication with the BECM 33 to provide temperature data regarding the traction battery 24.

The vehicle 12 may be, for example, an electric vehicle such as a plug-in hybrid vehicle, or a battery-electric vehicle in which the traction battery 24 may be recharged by an external power source 36. The external power source 36 may be a connection to an electrical outlet. The external power source 36 may be electrically connected to electric vehicle supply equipment (EVSE) 38. The EVSE 38 may provide circuitry and controls to regulate and manage the transfer of electrical energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34.

The various components discussed may have one or more associated controllers to control and monitor the operation of the components. The controllers may communicate via a serial bus (e.g., Controller Area Network (CAN)) or via discrete conductors.

The battery cells, such as a prismatic cell, may include electrochemical cells that convert stored chemical energy to electrical energy. Prismatic cells may include a housing, a positive electrode (cathode) and a negative electrode (anode). An electrolyte may allow ions to move between the anode and cathode during discharge, and then return during recharge. Terminals may allow current to flow out of the cell for use by the vehicle. When positioned in an array with multiple battery cells, the terminals of each battery cell may be aligned with opposing terminals (positive and negative) adjacent to one another and a busbar may assist in facilitating a series connection between the multiple battery cells. The battery cells may also be arranged in parallel such that similar terminals (positive and positive or negative and negative) are adjacent to one another. For example, two battery cells may be arranged with positive terminals adjacent to one another, and the next two cells may be arranged with negative terminals adjacent to one another. In this example, the busbar may contact terminals of all four cells.

The traction battery 24 may be heated and/or cooled using a liquid thermal management system, an air thermal management system, or other method as known in the art. In one example of a liquid thermal management system and now referring to FIG. 2, the traction battery 24 may include a battery cell array 88 shown supported by a thermal plate 90 to be heated and/or cooled by a thermal management system. The battery cell array 88 may include a plurality of battery cells 92 positioned adjacent to one another. The DC/DC converter module 28 and BECM 33 may also require cooling and/or heating under certain operating conditions. A thermal plate 91 may support the DC/DC converter module 28 and BECM 33 and assist in thermal management thereof. For example, the DC/DC converter module 28 may generate heat during voltage conversion which may need to be dissipated. Alternatively, thermal plates 90 and 91 may be in fluid communication with one another to share a common fluid inlet port and common outlet port.

Figure 2:
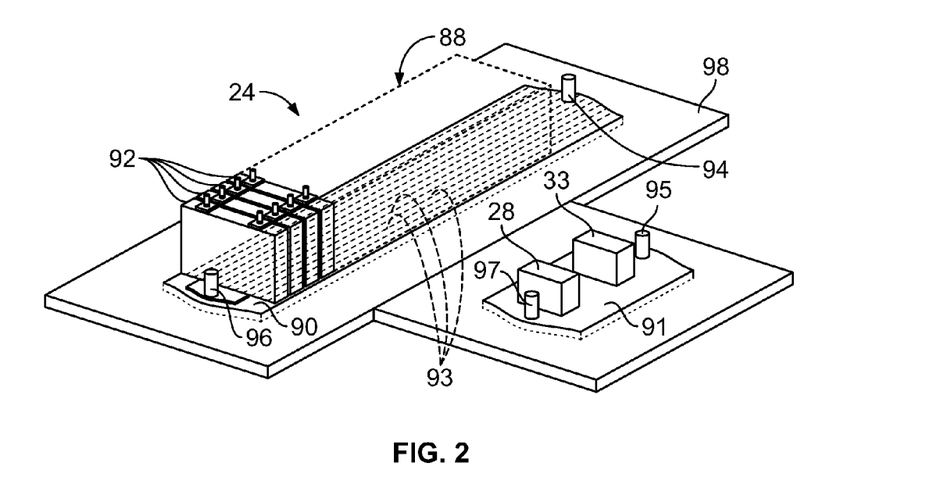
FIG. 2 is a perspective view of a portion of a thermal management system for the traction battery of the vehicle in FIG. 1.

In one example, the battery cell array 88 may be mounted to the thermal plate 90 such that only one surface, of each of the battery cells 92, such as a bottom surface, is in contact with the thermal plate 90. The thermal plate 90 and individual battery cells 92 may transfer heat between one another to assist in managing the thermal conditioning of the battery cell array 88 during vehicle operations. Uniform thermal fluid distribution and high heat transfer capability are two thermal plate 90 considerations for providing effective thermal management of the battery cell arrays 88 and other surrounding components. Since heat transfers between thermal plate 90 and thermal fluid via conduction and convection, the surface area in a thermal fluid flow field is important for effective heat transfer, both for removing heat and for preheating the battery cells 92 at cold temperatures. For example, charging and discharging the battery cells generates heat which may negatively impact performance and life of the battery cell array 88 if not removed. Alternatively, the thermal plate 90 may also provide heat to preheat the battery cell array 88 when subjected to cold temperatures.

The thermal plate 90 may include one or more channels 93 and/or a cavity to distribute thermal fluid through the thermal plate 90. For example, the thermal plate 90 may include an inlet port 94 and an outlet port 96 that may be in communication with the channels 93 for providing and circulating the thermal fluid. Positioning of the inlet port 94 and outlet port 96 relative to the battery cell arrays 88 may vary. For example and as shown in FIG. 2, the inlet port 94 and outlet port 96 may be centrally positioned relative to the battery cell arrays 88. The inlet port 94 and outlet port 96 may also be positioned to the side of the battery cell arrays 88. Alternatively, the thermal plate 90 may define a cavity (not shown) in communication with the inlet port 94 and outlet port 96 for providing and circulating the thermal fluid. The thermal plate 91 may include an inlet port 95 and an outlet port 97 to deliver and remove thermal fluid. Optionally, a sheet of thermal interface material (not shown) may be applied to the thermal plate 90 and/or 91 below the battery cell array 88 and/or the DC/DC converter module 28 and BECM 33, respectively. The sheet of thermal interface material may enhance heat transfer between the battery cell array 88 and the thermal plate 90 by filling, for example, voids and/or air gaps between the battery cells 92 and the thermal plate 90. The thermal interface material may also provide electrical insulation between the battery cell array 88 and the thermal plate 90. A battery tray 98 may support the thermal plate 90, thermal plate 91, battery cell arrays 88, and other components. The battery tray 98 may include one or more recesses to receive thermal plates.

Different battery pack configurations may be available to address individual vehicle variables including packaging constraints and power requirements. The battery cell arrays 88 may be contained within a cover or housing (not shown) to protect and enclose the battery cell arrays 88 and other surrounding components, such as the DC/DC converter module 28 and the BECM 33. The battery cell arrays 88 may be positioned at several different locations including below a front seat, below a rear seat, or behind the rear seat of the vehicle, for example. However, it is contemplated the battery cell arrays 88 may be positioned at any suitable location in the vehicle 12.

Two examples of desired thermal plate deliverables may include (i) extracting a maximum amount of heat from the battery cells and (ii) maintaining a substantially uniform temperature at a base of the battery cells. To achieve these deliverables, a thermal management system may take several considerations into account. For example, a temperature of the battery cell may vary across the cell between a minimum and a maximum temperature which may be referred to as a battery cell delta temperature ("cell $\Delta T$"). In a battery cell array, the temperatures of the battery cells may vary across the battery cell array between a minimum and maximum temperature which may be referred to as a battery cell array delta temperature ("array $\Delta T$"). Lower cell $\Delta T$ and array $\Delta T$ measurements typically indicate a more uniform temperature distribution throughout the battery cell and battery cell array, respectively. As such, maximizing overall heat transfer efficiency between the battery cell array and thermal plate may assist in minimizing cell $\Delta T$ and array $\Delta T$. A desired cell $\Delta T$ and a desired array $\Delta T$ may vary according to power requirements for different vehicles and thermal management systems.

Figure 3A:
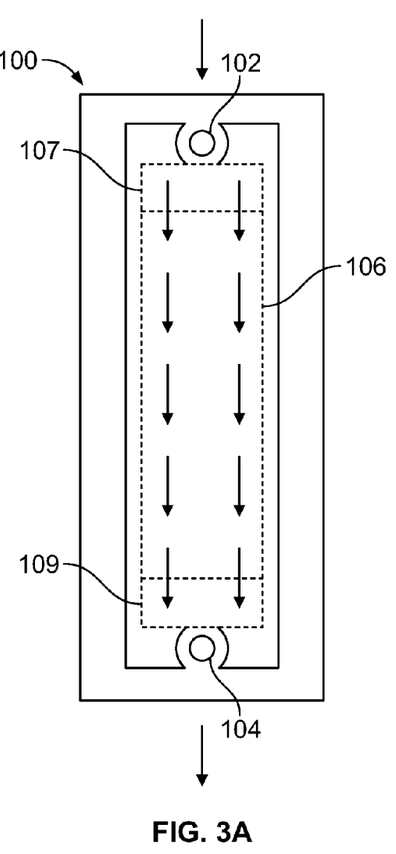
FIG. 3A is an illustrative plan view of a thermal plate configured for serial flow of thermal fluid.
Figure 3B:
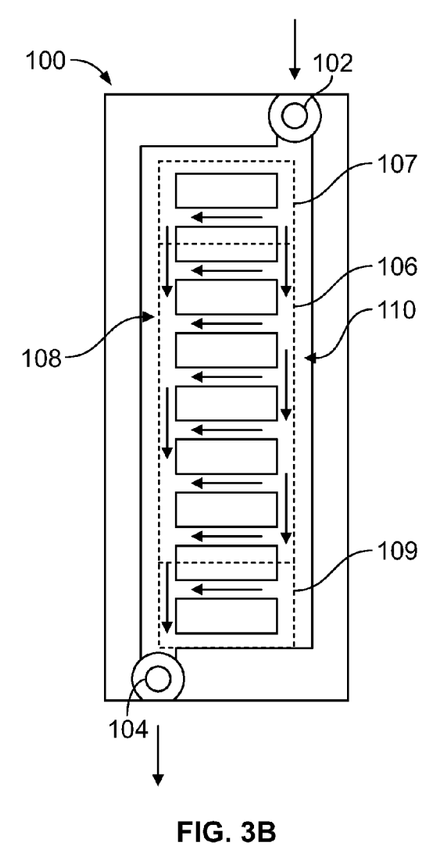
FIG. 3B is an illustrative plan view of a thermal plate configured for parallel flow of thermal fluid.
Figure 3C:
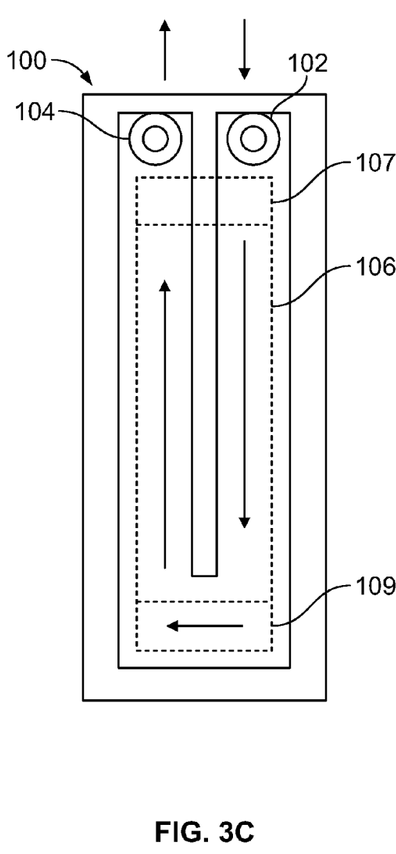
FIG. 3C is an illustrative plan view of a thermal plate configured for U-flow of thermal fluid.

Thermal plates may use varying types of liquid flow patterns to assist in extracting heat from the battery cells and battery cell arrays, and thus obtain desired cell $\Delta T$ and array $\Delta T$ performance. Thermal plate 100 in FIGS. 3A through 3C is shown in three configurations to illustrate examples of liquid serial flow, parallel flow, and U-flow, respectively. Thermal fluid, such as coolant, refrigerant, or water, may enter the thermal plate 100 via inlet port 102, travel across the thermal plate 100 as indicated by the directional reference arrows, and then exit the thermal plate 100 via outlet port 104. A footprint of a battery cell array 106 is shown with a dashed line. The battery cell array 106 may include battery cells such as a battery cell 107 and a battery cell 109, the footprints of which are also both shown with dashed lines. With each type of liquid flow example, thermal fluid traveling through the thermal plate 100 may absorb heat generated from the battery cells of the battery cell array 106.

In serial flow as shown in FIG. 3A, thermal fluid enters thermal plate 100 via inlet port 102 and may travel across the serial flow field in a substantially uniform fashion. The battery cell 109 is the last battery cell of the battery cell array 106 and nearest the outlet port 104. In this example, the battery cell 109 will operate at a higher temperature than the battery cell 107 nearer to the inlet port 102 since the thermal fluid flowing underneath the battery cell 109 will have absorbed heat from the battery cell array 106 while traveling across the thermal plate 100. The difference in operating temperatures for the battery cell 107 and battery cell 109 will drive a high array $\Delta T$ of battery cell array 106 in this example which may negatively affect vehicle performance.

In parallel flow as shown in FIG. 3B, thermal fluid enters the thermal plate 100 via the inlet port 102 and travels along an entry channel 110 prior to distribution in a horizontal direction below the battery cell array 106. The thermal fluid will be at its coolest temperature while in the entry channel 110. A portion of the battery cells 107 and 109 within the battery cell array 106 nearer to an exit channel 108 will see warmer thermal fluid than the portions of battery cells 107 and 109 which are nearer to the entry channel 110. This may result in a higher cell $\Delta T$ which may negatively affect the performance of the battery cell array 106 and the life of the battery cells therein.

In U-flow as shown in FIG. 3C, the battery cell 109, furthest from the inlet port 102 and outlet port 104, may see average temperature (relative to the rest of the battery cells within the battery cell array 106) while the battery cell 107, nearest the inlet port 102 and outlet port 104, may see the warmest fluid on one half of the battery cell and the coolest fluid on the other half, which may tend to average one another out. Therefore, the measured array $\Delta T$ is lower than parallel flow and serial flow and the U-flow system may consequently improve vehicle performance. However, in this example of U-flow the first few battery cells nearest the inlet port 102 and outlet port 104 may see a difference in temperature between their respective two halves which may result in a high cell ΔT. This may negatively affect the performance of the battery cell array 106 and the life of the battery cells therein.

Figure 4:
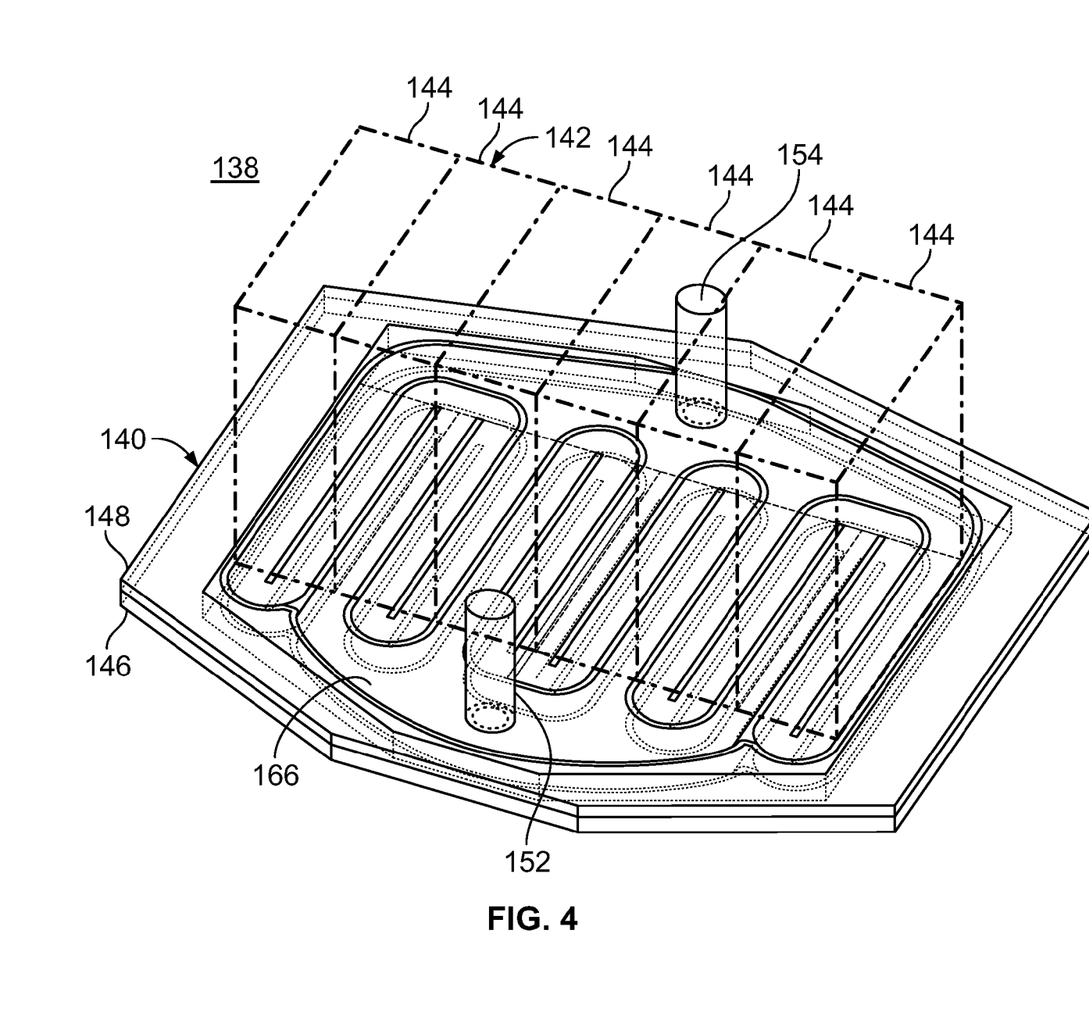
FIG. 4 is a perspective view of a portion of a traction battery assembly including a thermal plate supporting a battery cell array.
Figure 5:
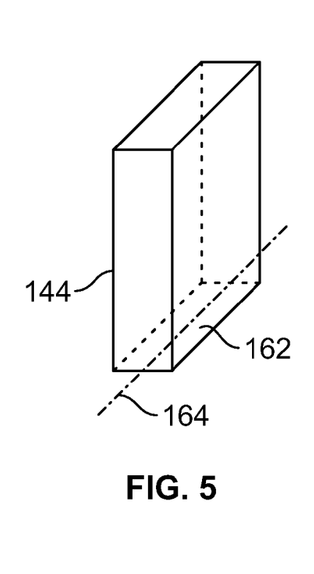
FIG. 5 is a perspective view of a battery cell from the battery cell array of FIG. 4.
Figure 6:
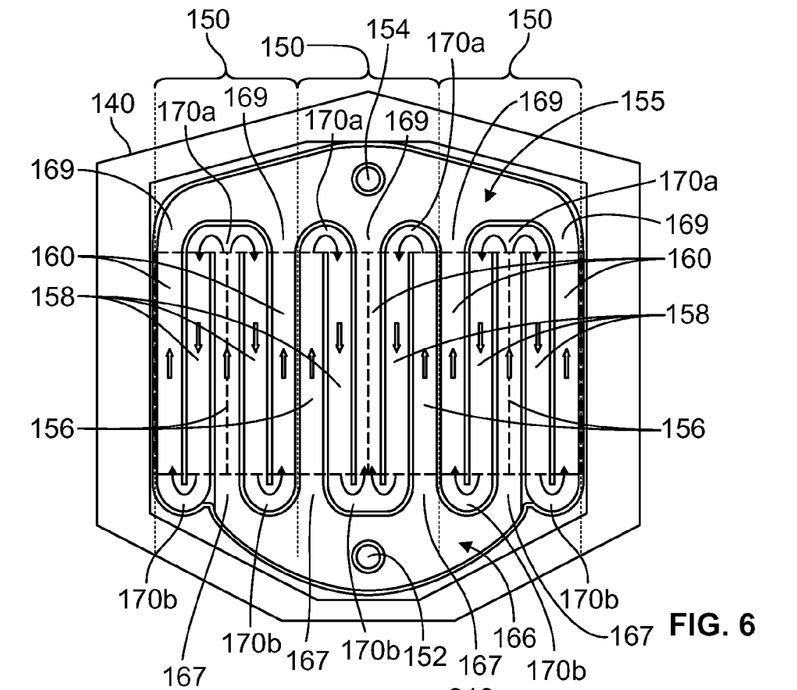
FIG. 6 is a plan view of a multi-pass channel configuration for the thermal plate from FIG. 4.

Now referring to FIGS. 4 through 6, a portion of traction battery assembly 138 is shown which may include a thermal plate 140 configured to support a battery cell array 142 including battery cells 144. Other structural elements (not shown) may be used to support the battery cell array 142 within the vehicle as well. A bottom portion of the battery cells 144 or a bottom face of the battery cells 144 may directly contact the thermal plate 140 such that thermal plate 140 supports the battery cells 144. As described above, a sheet of thermal interface material (not shown) may be positioned between the thermal plate 140 and the battery cells 144. The thermal plate 140 may also be configured to facilitate thermal communication between the thermal plate 140 and the battery cells 144.

The thermal plate 140 may include a bottom plate 146 and an upper plate 148. The upper plate 148 may be fixed to the bottom plate 146. While multiple methods of securing the upper plate 148 to the bottom plate 146 are available, one example for Aluminum plates includes brazing. Another example includes fastening methods using, for example, seals, nuts, and bolts. An inlet port 152 may be positioned at one end of the thermal plate 140 and an outlet port 154 may be positioned opposite the inlet port 152. The thermal plate 140 or bottom plate 146 may define one or more sets of multi-pass channel configurations sometimes referred to as constructs. These channel configurations may correspond to one or more battery cells 144 and assist in cooling the same. For example, channel configurations 150 may each include five channels having at least one entry channel 156, at least two intermediate channels 158, and at least one exit channel 160. Walls defined by the thermal plate 140 may be shared between adjacent channels and also may provide a path for heat to travel through the thermal plate 140. In this example, two battery cells 144 may correspond to each channel configuration 150, however, it is contemplated that alternative sizes and types of battery cells 144 may provide for different relationships with the channel configurations 150.

The channels may have a transverse orientation relative to the battery cell array 142. The battery cells 144 may each define a bottom face 162 which may contact the thermal plate 140 and/or be in thermal communication therewith. Examples of thermal communication include conduction and convection. It is also contemplated that the bottom faces 162 of the battery cells 144 may contact a thermal interface material (not shown) secured to the thermal plate 140 and positioned above the channel configurations 150. As mentioned above, the thermal interface material may enhance heat transfer between the battery cells 144 and the thermal plate 140. The thermal interface material may also provide electrical insulation between the battery cells 144 and the thermal plate 140. Each bottom face 162 may include a central axis 164 which may be substantially parallel to the entry channels 156, the intermediate channels 158, and the exit channels 160. The battery cells 144 may each have a width, and a length greater than the width. Each of the multi-pass channels may be arranged to direct fluid flow along the length of the corresponding battery cell 144.

Optionally, an inlet plenum 166 may be arranged between the inlet port 152 and entry channels 156 of the channel configurations 150. Optionally, an exit plenum 155 may be arranged between the exit channels 160 of the channel configurations 150 and the outlet port 154. Optionally, the thermal plate 140 may define the inlet port 152, the outlet port 154, the inlet plenum 166, and the exit plenum 155. In this example, the inlet plenum 166 and exit plenum 155 do not need to be secured above or below the thermal plate 140 as sometimes required in other types of thermal plates.

The transverse orientations of the channels within the channel configurations 150 may provide for the respective battery cells 144 of the battery cell array 142 to receive additional thermal cooling benefits since the thermal fluid makes multiple passes underneath the respective battery cell 144. As shown by the arrows in FIG. 6, the direction of thermal fluid flow within the channels alternates in direction between adjacent channels. For example, thermal fluid may enter the inlet plenum 166 via the inlet port 152 en route to channel inlets 167 and the entry channels 156. The thermal fluid may enter the entry channels 156 and travel in a first direction toward the respective routers 170a. The routers 170a may then redirect the thermal fluid to one or more intermediate channels 158 such that the thermal fluid flows in a second direction. The respective routers 170b may then redirect the thermal fluid to the respective exit channels 160 and channel outlets 169 such that the thermal fluid flows in the first direction en route to the exit plenum 155 and the outlet port 154.

This arrangement may provide improved vehicle performance and assist in prolonging the life of the battery cells 144 when compared with the serial flow or parallel flow arrangements as shown in FIGS. 3A and 3B, respectively. For example, thermal fluid entering the entry channels 156 may be referred to as "cold" fluid since the fluid is fresh from the inlet port 152. Thermal fluid flowing through the intermediate channels 158 may be referred to as "warm" fluid since the fluid may absorb some heat in reaching the intermediate channels 158. Thermal fluid flowing through exit channels 160 may be referred to as "hot" fluid since the fluid may absorb additional heat in reaching the exit channels 160. As such, a first temperature of the thermal fluid in exit channels 160 may be warmer than a second temperature of the thermal fluid in the intermediate channels 158 which may be warmer than a third temperature of the thermal fluid in the entry channels 156. As shown in FIGS. 4 and 6, the channels are arranged such that the entry channels 156 may be adjacent to one or more intermediate channels 158, and/or adjacent to one of the exit channels 160 from another channel configuration and share the same wall defined by the thermal plate 140.

Figure 7:
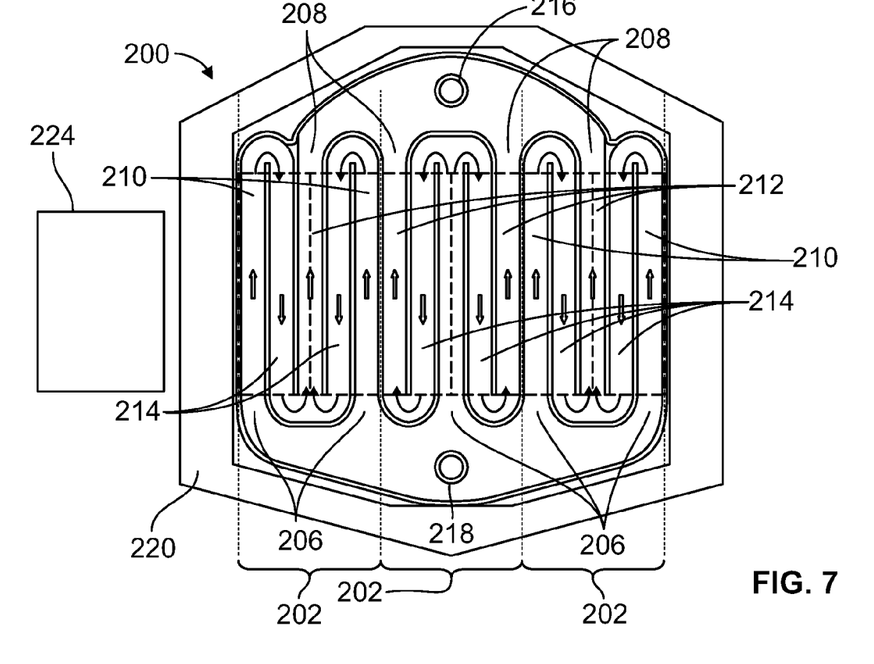
FIG. 7 is a plan view of another multi-pass channel configuration for a thermal plate.

In the example included in FIGS. 4 and 6, there are three channel configurations having a total of four channel inlets 167 and five channel outlets 169. However, it is contemplated that other combinations may be available. For example, FIG. 7 shows an illustrative thermal plate 200 which may be configured to support a battery cell array (not shown) as described above. The thermal plate 200 may define three multi-pass channel configurations 202 having a total of five channel inlets 206 and four channel outlets 208. As described above, the channels are arranged such that fluid flows in a first direction within entry channels 210 and exit channels 212, and a second direction within intermediate channels 214.

The thermal plate 200 may define an inlet port 218 and an outlet port 216 to deliver and remove thermal fluid from the channel configurations, respectively. The inlet port 218 and the outlet port 216 may also be separate elements secured to the thermal plate 200. As shown in FIG. 7, thermal fluid exiting the exit channels 212 and channel outlets 208 empties into the outlet port 216 and not into the one of the entry channels 210 of another channel configuration.

The thermal plate 200 may also define a plate perimeter 220 extending around the thermal plate 200 and configured to receive a clamping force. For example, clamping forces may be applied when the thermal plate 200 is assembled with a battery cell array (not shown). Certain packaging constraints may dictate that the outer portion of the thermal plate 200, such as plate perimeter 220, does not include thermal fluid channels to provide increased structural integrity to the thermal plate 200 while receiving the clamping force. These same packaging constraints may also influence the type of channel configuration used for a particular thermal plate, such as thermal plate 200. For example, a heat generating module 224 may be positioned adjacent and/or proximate to the plate perimeter 220. In this example, the thermal plate 200 may be preferred over thermal plate 140 since one of the entry channels 210 is located adjacent to the heat generating module 224. Thus, thermal fluid flowing within the entry channel 210 adjacent to a vicinity of the plate perimeter 220 may assist in shielding the battery cell array from heat generated by the heat generating module 224 and/or may assist in cooling the heat generating module 224 under certain conditions. Examples of the heat generating module 224 include a DCDC converter unit and a BECM.

Figures 8, 9:
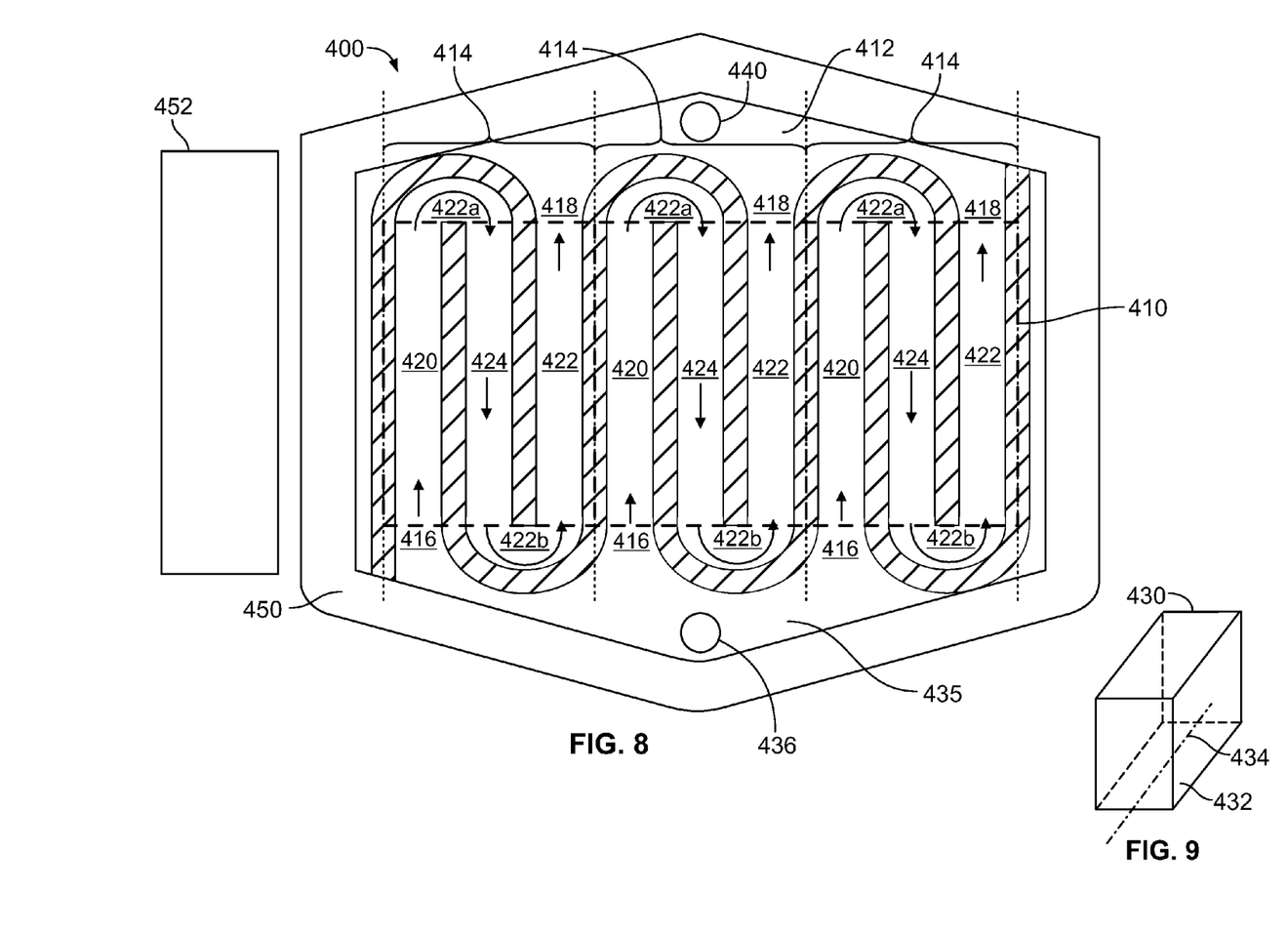
FIG. 8 is a plan view of another multi-pass channel configuration for a thermal plate.
FIG. 9 is a perspective view of a battery cell for use with the multi-pass channel configuration from FIG. 8.

FIG. 8 shows another example of a portion of a traction battery assembly. A thermal plate 400 may be positioned beneath a battery cell array 410 (a footprint of which is shown as dashed line 410). The thermal plate 400 may be configured to support the battery cell array 410 and may be configured for thermal communication with battery cells of the battery cell array 410. The battery cell array 410 may include a plurality of battery cells. The thermal plate 400 may define and/or include an exit plenum 412. In one example as shown in FIG. 8, the thermal plate 400 may also define and/or include multi-pass channels, for example three multi-pass channel configurations 414 which may each correspond to one of the battery cells. In this example, the multi-pass channel configurations may also be referred to as a single channel 414. In other examples, more or fewer multi-pass channel configurations 414 may be utilized.

Each of the channels configurations 414 may include a channel inlet 416 and a channel outlet 418. The channel inlets 416 and the channel outlets 418 may be located at opposite ends of the channels configurations 414 such that fluid exiting the channel outlets 418 empties into the exit plenum 412 and does not empty into the channel inlet 416 of another channel configuration 414. As such, the thermal communication is such that each of the channel configurations 414 are oriented relative to the corresponding battery cell such that fluid enters the channel inlet 416 at a first temperature and exits the channel outlet 418 at a second temperature. For example, each channel 414 and/or multi-pass channel configuration 414 may include an entry channel 420 which opens to the respective channel inlet 416, an exit channel 422 which opens to the respective channel outlet 418, and an intermediate channel 424 therebetween such that adjacent channels may share a common wall defined by the thermal plate. The exit channel 422 of one of the channel configurations 414 may also share a common wall with the entry channel 420 of another channel configuration 414.

The entry channel 420, the exit channel 422, and the intermediate channel 424 may be arranged to direct thermal fluid flow in a transverse direction relative to the battery cell array 410. FIG. 9 shows a battery cell 430 of the battery cell array 410. The battery cell 430 may define a bottom face 432 which may contact the thermal plate 400 and/or be in thermal communication therewith. Each bottom face 432 may include a central axis 434 which may be substantially parallel to the entry channels 420, the exit channels 422, and the intermediate channel 424. The battery cells 430 may each have a width, and a length greater than the width. Each of the multi-pass channels may be arranged to direct fluid flow along the length of the corresponding battery cell 430.

Optionally, an inlet plenum 435 may be arranged between an inlet port 436 and the entry channels 420. Optionally, the exit plenum 412 may be arranged between an outlet port 440 and the exit channels 422. Optionally, the thermal plate 400 may define the inlet port 436, the outlet port 440, the inlet plenum 435, and the exit plenum 412. In this example, the inlet plenum 435 and exit plenum 412 do not need to be secured above or below the thermal plate 400 as sometimes required in other types of thermal plates.

The transverse orientations of the channels within the channel configurations 414 may provide for the corresponding battery cells to receive additional thermal cooling benefits, such as reducing battery cell temperature gradient, since the thermal fluid makes multiple passes underneath the respective battery cell. As shown by the arrows in FIG. 8, the direction of thermal fluid flow within the channels alternates in direction between adjacent channels. For example, thermal fluid may enter the inlet plenum 435 via the inlet port 436 en route to the channel inlets 416 and the entry channels 420. The thermal fluid may enter the entry channels 420 and travel in a first direction toward a respective router 422a. The routers 422a may then redirect the thermal fluid to the intermediate channels 424 such that the thermal fluid flows in a second direction. Routers 422b may then redirect the thermal fluid to the respective exit channels 422 and the channel outlets 418 such that the thermal fluid flows in the first direction en route to the exit plenum 412 and/or the outlet port 440.

The thermal plate 400 may also define a plate perimeter 450 extending around the thermal plate 400 and configured to receive a clamping force. For example, clamping forces may be applied when the thermal plate 400 is assembled with the battery cell array 410. Certain packaging constraints may dictate that the outer portion of the thermal plate 400, such as plate perimeter 450, does not include thermal fluid channels to provide increased structural integrity to the thermal plate 400 while receiving the clamping force. These same packaging constraints may also influence the type of channel configuration used for a particular thermal plate, such as thermal plate 400. For example, a heat generating module 452 may be positioned adjacent and/or proximate to the plate perimeter 450. In this example, one of the entry channels 420 is located adjacent to the heat generating module 452. Thus, thermal fluid flowing within the entry channel 420 adjacent to the plate perimeter 450 may assist in shielding the battery cell array from heat generated by the heat generating module 452 and/or may assist in cooling the heat generating module 452 under certain conditions. Examples of the heat generating module 452 includes a DCDC converter unit and a BECM.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a plurality of battery cells; and
   a thermal plate positioned to support all of the battery cells and defining an exit plenum and a plurality of multi-pass channels therein, wherein each of the channels corresponds to at least one of the cells and includes an inlet and outlet positioned such that fluid exiting the outlet empties into the exit plenum and not into the inlet of another channel.

2. The vehicle of claim 1, further comprising a heat generating module packaged within a vicinity of the thermal plate, wherein the thermal plate is arranged relative to the module such that one of the inlets is positioned adjacent to the module.

3. The vehicle of claim 1, wherein each of the multi-pass channels is arranged to direct fluid flow back and forth across a same face of one of the battery cells.

4. The vehicle of claim 1, wherein each of the battery cells has a width and a length greater than the width and wherein each of the multi-pass channels is arranged to direct fluid flow along the length of the corresponding battery cell.

5. The vehicle of claim 1, wherein each of the multi-pass channels corresponds to only one of the battery cells.

6. The vehicle of claim 1, further comprising an outlet port in fluid communication with the exit plenum and an inlet port in fluid communication with the inlets, and wherein the outlet port and inlet port are positioned at opposite ends of the thermal plate.

7. A traction battery assembly comprising:
   a plurality of battery cells; and
   a thermal plate positioned beneath the plurality of battery cells for thermal communication therewith, and defining a plurality of multi-pass channel configurations therein, wherein each of the channel configurations corresponds to one of the battery cells, includes a channel inlet and channel outlet on opposite side portions of the thermal plate, and is configured to direct fluid flowing therein to an outlet port of the thermal plate without directing fluid to the channel inlet of another channel configuration.

8. The traction battery assembly of claim 7, wherein each of the multi-pass channel configurations defines an entry channel, an exit channel, and an intermediate channel therebetween and wherein the channels are arranged such that adjacent channels share a common wall.

9. The traction battery assembly of claim 8, wherein the channels are arranged such that the exit channel of one of the channel configurations shares a wall with the entry channel of another channel configuration.

10. The traction battery assembly of claim 8, wherein each of the battery cells has a width, and a length greater than the width and wherein each of the channels is arranged to direct fluid flow along the length of the corresponding battery cell.

11. The traction battery assembly of claim 7, wherein each of the multi-pass channel configurations is arranged such that a fluid temperature at the channel inlet is less than a fluid temperature at the channel outlet.

12. The traction battery assembly of claim 7, wherein each of the multi-pass channel configurations is arranged such that a fluid temperature at the channel inlet is greater than a fluid temperature at the channel outlet.

13. A battery thermal system comprising:
   a thermal plate positioned beneath an array of battery cells and defining an inlet port and an outlet port positioned at opposite ends of the thermal plate, and at least two internal multi-pass channel configurations each including at least one entry channel in communication with the inlet port and at least one exit channel in communication with the outlet port, the channels being arranged such that fluid flows in a same direction within the entry and exit channels, and fluid exiting the exit channel empties into the outlet port and not the entry channel of another multi-pass channel configuration, wherein one of the exit channels shares a wall with the entry channel of another of the multi-pass channel configurations.

14. The system of claim 13, wherein at least one of the multi-pass channel configurations further includes a second entry channel and at least two intermediate channels arranged between the entry channels and wherein the at least one exit channel is arranged between the at least two intermediate channels.

15. The system of claim 13, wherein at least one of the multi-pass channel configurations further includes a second exit channel and at least two intermediate channels arranged between the exit channels and wherein the at least one entry channel is arranged between the at least two intermediate channels.

* * * * *